(12) United States Patent
Tin et al.

(10) Patent No.: US 11,585,930 B2
(45) Date of Patent: Feb. 21, 2023

(54) SILICON PHOTONICS INTEGRATED OPTICAL VELOCIMETER

(71) Applicant: Honeywell International Inc., Morris Plains, NJ (US)

(72) Inventors: Steven Tin, Edina, MN (US); Matthew Wade Puckett, Phoenix, AZ (US); Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 472 days.

(21) Appl. No.: 16/784,111

(22) Filed: Feb. 6, 2020

(65) Prior Publication Data
US 2021/0247515 A1   Aug. 12, 2021

(51) Int. Cl.
  *G01P 3/36*   (2006.01)
  *G01S 17/58*   (2006.01)
  *G01S 7/4915*   (2020.01)

(52) U.S. Cl.
  CPC ............ *G01S 17/58* (2013.01); *G01S 7/4915* (2013.01)

(58) Field of Classification Search
  None
  See application file for complete search history.

(56) References Cited

U.S. PATENT DOCUMENTS

| | | | |
|---|---|---|---|
| 8,190,030 B2 | 5/2012 | Leclair et al. | |
| 8,508,722 B2 | 8/2013 | Rogers et al. | |
| 9,310,487 B2 | 4/2016 | Sakimura et al. | |
| 9,476,981 B2 * | 10/2016 | Yaacobi | G02F 1/292 |
| 11,061,140 B2 * | 7/2021 | Hosseini | G01S 7/4816 |
| 2013/0162976 A1 | 6/2013 | Dakin et al. | |
| 2017/0153319 A1 | 6/2017 | Villeneuve et al. | |
| 2017/0307648 A1 * | 10/2017 | Kotake | G01S 17/58 |

FOREIGN PATENT DOCUMENTS

CN   111007483 A  *  4/2020  ............ G01S 7/481

* cited by examiner

*Primary Examiner* — Mark Hellner
(74) *Attorney, Agent, or Firm* — Fogg & Powers LLC

(57) ABSTRACT

Systems and methods for a silicon photonics integrated optical velocimeter are provided herein. In some embodiments, a method includes producing a laser output at a laser source; emitting the laser output from a plurality of emitters formed in an optical chip; receiving a plurality of reflected portions of the emitted laser output at an optical collector formed in the optical chip, wherein the plurality of reflected portions are reflected off of at least one surface; beating the laser output against the reflected portions of the emitted laser output, wherein one of the laser output or the reflected portions of the emitted laser output are modulated by at least one modulation frequency; and calculating a doppler shift for each of the plurality of reflected portions of the emitted laser output based on an output of the beating and the at least one modulation frequency.

18 Claims, 9 Drawing Sheets

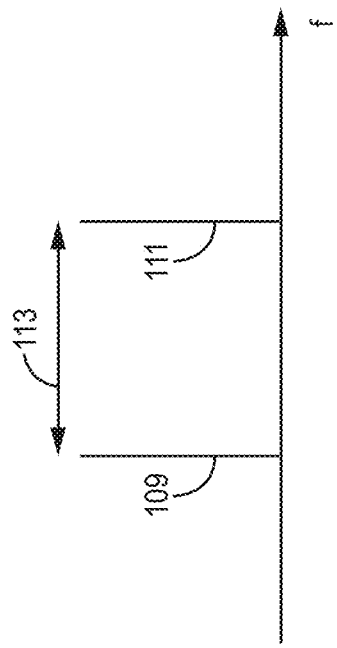
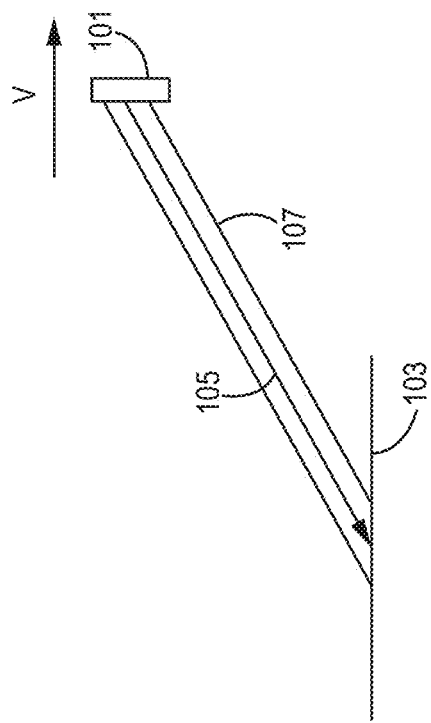
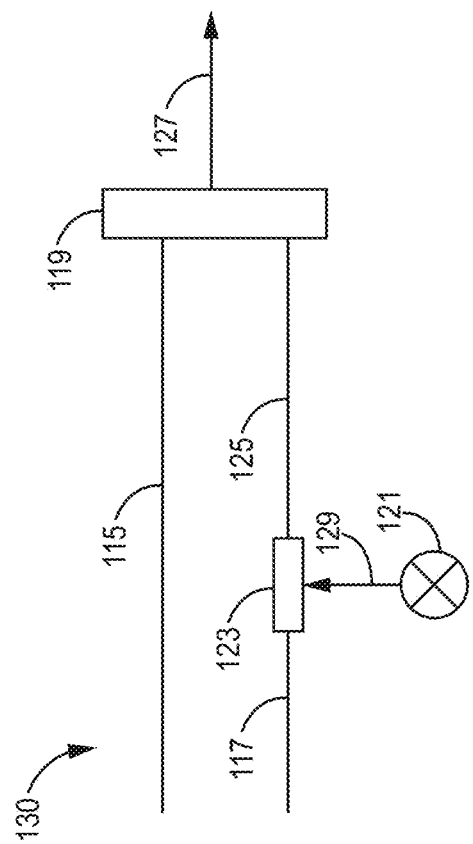
FIG. 1A
FIG. 1B
FIG. 1C

SILICON PHOTONICS INTEGRATED OPTICAL VELOCIMETER

BACKGROUND

Many systems provide velocity measurements for use in a wide range of applications. In some examples, velocity measurements may be used as an aiding source for navigation in GPS denied environments. Presently, examples of currently available systems that provide velocity measurements include Lidar or Radar based velocimeters. Lidar based velocimeters, while accurate, are large and consume a substantial amount of power. Radar based velocimeters have a lower sensitivity than Lidar based velocimeters and lower angle resolution. Radar is also a larger system. Thus, due to the size and power consumed of current velocimeters, challenges exist when attempting to integrate velocimeters with MEMS inertial sensors.

SUMMARY

Systems and methods for a silicon photonics integrated optical velocimeter are provided herein. In some embodiments, a method includes producing a laser output at a laser source. The method further includes emitting the laser output from a plurality of emitters formed in an optical chip. Also, the method includes receiving a plurality of reflected portions of the emitted laser output at an optical collector formed in the optical chip, wherein the plurality of reflected portions are reflected off of at least one surface. Additionally, the method includes beating the laser output against the reflected portions of the emitted laser output, wherein one of the laser output or the reflected portions of the emitted laser output are modulated by at least one modulation frequency. Moreover, the method includes calculating a doppler shift for each of the plurality of reflected portions of the emitted laser output based on an output of the beating and the at least one modulation frequency.

DRAWINGS

Understanding that the drawings depict only some embodiments and are not therefore to be considered limiting in scope, the exemplary embodiments will be described with additional specificity and detail using the accompanying drawings, in which:

FIGS. 1A-1C are diagrams providing an exemplary illustration of the operation of a velocimeter according to one or more aspects of the present disclosure;

Figure 2A:
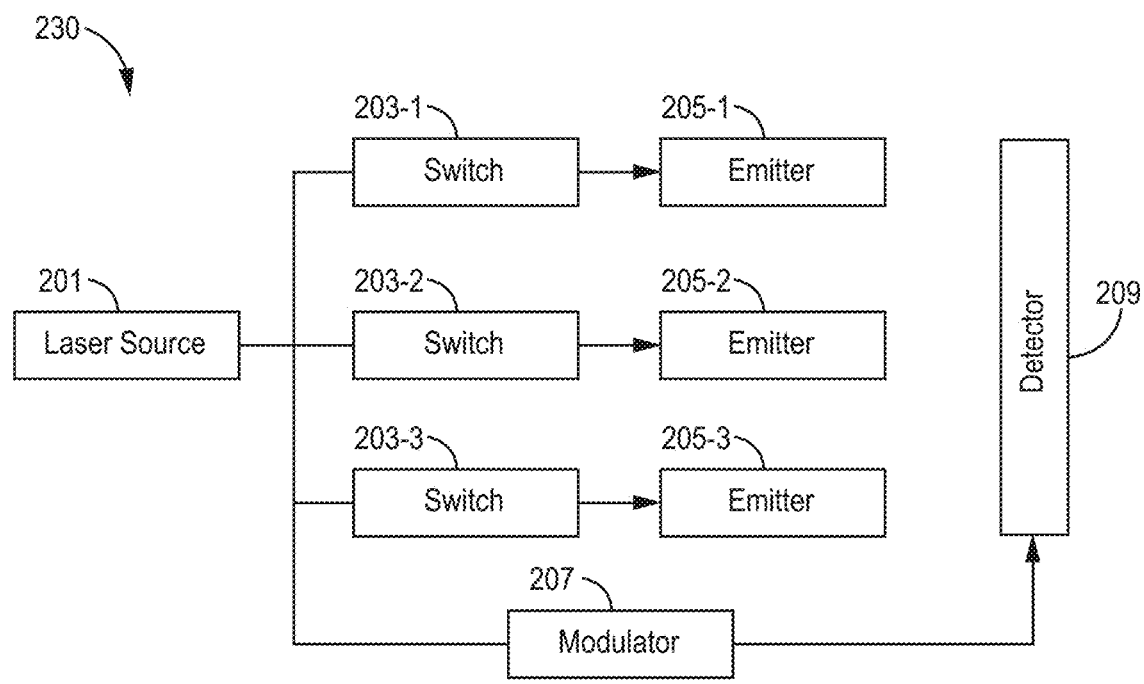
FIG. 2A is a block diagram illustrating a time division multiplexed velocimeter according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Embodiments described herein are drawn to systems and methods for providing silicon photonics integrated optical velocimeters. It is desirable to limit the size, weight, power, and cost of devices so that they can be implemented in a wider range of devices. As described above, typical velocimeters are large and consume substantially enough power to prevent their integration with other MEMS inertial sensors that achieve desired goals for size, weight, power, and cost. Embodiments described herein provide for a velocimeter that is an integrated silicon photonics device that provides highly accurate velocity measurements that could be integrated with other MEMS inertial sensors. Together, the MEMS inertial sensors and the velocimeter may provide navigation solutions, especially in GPS denied environments.

FIGS. 1A-1C are diagrams illustrating the use of optical signals to acquire velocity information. As illustrated, FIG. 1A illustrates the acquisition of velocity information by a velocimeter 101 in reference to a surface 103. In some embodiments, the velocimeter 101 may be an optical velocimeter, such as a laser velocimeter, that uses light to detect the velocity of the sensor 101 in reference to a target region of the surface 103. For example, the optical velocimeter 101 may be a sensor mounted on or within an object (such as a vehicle, a phone, or other device for which velocity measurement may be useful) that emits an optical beam 105 toward a surface 103 over which the sensor 101 is traveling with a particular velocity. The surface 103 may scatter or reflect the optical beam 105 incident on the surface 103. A reflected portion 107 of the scattered or reflected optical beam light may be reflected back by the surface 103 towards the sensor 101 off of the surface and be detected by the optical velocimeter 101. The sensor 101, or computational device connected thereto, may use information associated with the emitted optical beam 105 and the reception of the reflected portion 107 to provide velocity measurements.

In certain embodiments, the sensor 101 may include a processing unit, be connected to a similar computational device, or some combination of a processing unit and external computational device. For example, the processing unit or similar computational device may use the information acquired by the sensor 101 to calculate and may provide a velocity measurement for the sensor 101 in relation to the surface 103. The processing unit may be implemented using software, firmware, hardware, or other appropriate combination thereof. The processing unit and/or other computational devices may be supplemented by, or incorporated in, specially-designed application-specific integrated circuits (ASICs) or field programmable gate arrays (FPGAs). The processing unit and other computation devices may also include or function with software programs, firmware, or other computer readable instructions for carrying out various process tasks, calculations, and control functions used in the present methods and systems.

Further, computational methods described herein for the computation of velocity measurements may be implemented by computer executable instructions such as program modules or components, which are executed by at least one processing unit. Generally, program modules include routines, programs, objects, data components, data structures, algorithms, and the like, which perform particular tasks or implement particular abstract data types. Instructions for carrying out various process tasks, calculations, and generation of the other data used in the operations of the methods described herein may be implemented in software, firmware, or other computer readable instructions. These instructions are typically stored on any appropriate computer program product that includes a computer-readable medium used for storage of computer-readable instructions or data structures. The computer-readable medium may be any available media that can be accessed by a general purpose or special purpose computer or processor or any programmable logic device. In certain implementations, the computer readable medium may be stored on a memory unit.

Suitable computer-readable storage media, such as that found within a memory unit, may include, for example, non-volatile memory devices including semi-conductor memory devices such as random access memory (RAM does print, read-only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, when the sensor 101 is traveling with a particular velocity (V) in relation to the surface 103, the reflected portion 107 of the emitted optical beam 105 may experience a doppler shift. For example, the frequency of the reflected portion 107 of the light may be shifted from the frequency of the emitted optical beam 105 by an amount proportional to the velocity of the sensor 101. For example, FIG. 1B is a graph illustrating the difference in frequencies between the reflected portion 107 and the emitted optical beam 105. As shown, a frequency 109 may be associated with the frequency of the emitted optical beam 105. Additionally, a reflected frequency 111 may be associated with the frequency of the reflected portion 107 of the emitted optical beam 105. As illustrated, when the sensor 101 is traveling with a particular velocity, the reflected frequency 111 may be different than the frequency 109 by an amount referred to herein as a Doppler shift 113. Thus, the magnitude of the Doppler shift 113 may be greater than zero and proportional to the velocity of the sensor 101 in relation to the surface 103.

FIG. 1C illustrates a system 130 for acquiring the magnitude of the Doppler shift 113 from information associated with the emitted optical beam 105 and the reflected portion 107. As shown, the system 130 is illustrative of methods and systems used to acquire information related to the Doppler shift 113. However, other systems may provide similar functionality using different components than those illustrated in system 130. In some implementations, the system 130 may have two input signals.

In some embodiments, the input signals may include a Doppler shifted input signal 115 and an emitted input signal 117. The shifted input signal 115 may be the received reflected portion 107 of the emitted optical beam 105. The emitted input signal 117 may be a portion of optical energy having similar characteristics to the emitted optical beam 105.

Additionally, the system 130 may include a frequency source 121 that provides a modulation signal 129 at a modulation frequency to a modulator 123. Accordingly, the modulator 123 may modulate the emitted input signal 117 using a modulation signal provided by the frequency source 121. Thus, the modulator 123 may provide a modulated signal 125 that is the emitted input signal 117 modulated by the modulation signal 129 provided by the frequency source 121. While, the system 130 shows the modulation of the emitted input signal 117, the modulation of the emitted input signal 117 may be optional. However, modulating the emitted input signal 117 may move the frequency of the output signal 127 away from baseband. In some embodiments, moving the output signal 127 away from baseband may improve performance of the system 130 by avoiding noise that could potentially exist at baseband.

In further embodiments, the modulated signal 125 and the shifted input signal 115 may both be incident on a detector 119. The detector 119 may be a photodetector configured to produce electrical signals associated with the light incident on the detector 119. As illustrated, the modulated signal 125 may be at the frequency of the emitted input signal 117 plus the frequency of the modulation signal 129. Also, the shifted input signal 115 may be at the frequency of the emitted input signal 117 plus the frequency of the Doppler shift 113. The detector 119 or other device (such as an interferometer) may beat the two received signals together and produce an output signal 127 at the frequency of the doppler shift 113 plus the frequency of the modulation signal 129. In some embodiments, subtracting the output signal 127 by the known frequency of the modulation signal 129 may produce a signal at the frequency of the doppler shift 113. Using the frequency of the doppler shift 113, which is proportional to the relative velocity between the sensor 101 and the surface 103, the system 130 may compute the velocity of the sensor 101.

FIG. 2A is a block diagram illustrating one embodiment of a system 230 implementing time division multiplexing. As illustrated, the system 230 may include a laser source 201. The laser source 201 may function as a light source for providing the optical beam (also referred to as a laser, laser output, laser beam, light beam, and the like) that is emitted from the system 230 towards target surfaces, such as surface 103. The laser source 201 may be small laser diodes, short-cavity fiber lasers, miniature solid state lasers, hybrid silicon lasers, and the like. The laser source 201 can also be co-fabricated with other optical components on the same optical substrate. The output from the laser source 201 is provided on one or more emitter paths and a detector path.

As shown, the system 230 may include three different emitters 205-1-205-3. The laser source 201 may provide optical energy to the emitters 205-1-205-3 along one of three respective paths. As the system 230 is a time division multiplexing velocimeter, each emitter path may also include a respective switch 203. Accordingly, light from the laser source 201 is only able to propagate towards a single emitter 205 at a time.

Figure 2B:
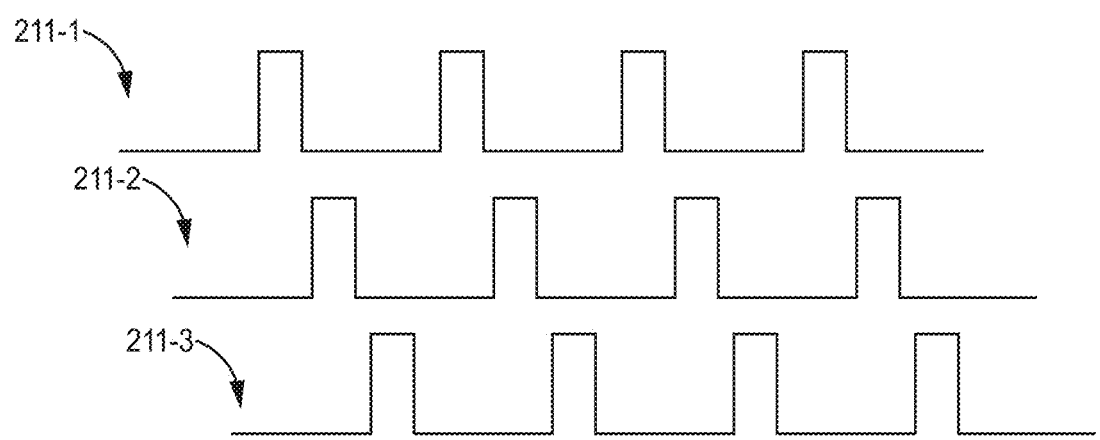
FIG. 2B is a diagram of a timing chart for emitting signals from a time division multiplexed velocimeter according to an aspect of the present disclosure.

In some embodiments, FIG. 2B is a graph illustrating the intensity of light emitted from each emitter 205 at a given time. In particular, graph 211-1 corresponds to the intensity of light emitted from the emitter 205-1, graph 211-2 corresponds to the intensity of light emitted from the emitter 205-2, and graph 211-3 corresponds to the intensity of light emitted from the emitter 205-3. As shown, when light is emitted from the emitter 205-1, light is not emitted from the emitters 205-2 and 205-3. Similarly, when light is emitted from the emitter 205-2, light is not emitted from the emitters 205-1 and 205-3. Likewise, when light is emitted from the emitter 205-3, light is not emitted from the emitters 205-1 and 205-2.

In certain embodiments, to control when light is emitted from the emitters, the system 230 may include multiple switches 203-1-203-3, where each switch 203-1-203-3 is associated with one of the emitters 205-1-205-3. In some embodiments, to control the operation of the switches, the system 230 may include or be connected to a switch controller (not shown). The switch controller may control the switches 203-1-203-3 such that only one switch 203 allows light to pass through the switch 203 to the associated emitter 205 at a time.

As shown, the system 230 may include three different emitters 205 and associated switches 203. The system 230 may include three different emitters 205 to acquire measurements of velocity in three separate dimensions. For example, the three separate emitters 205-1-205-3 may emit light in different directions such that components of the measurements provide velocity information in three separate dimensions with respect to the system 230. While three different emitters 205 are shown, the system 230 may include one, two, or more emitters 205 depending on the dimensions measured by the system 230 and/or the desired accuracy of the measurements provided by the system 230.

As discussed above, the emitters 205 emit light from the system 230 towards a surface (such as surface 103 in FIG. 1A). The light is reflected off of the surface back towards the system 230 where the system 230 detects a portion of the reflected light that is incident on a detector 209. The detector 209 may function substantially as described above with respect to the detector 119 in FIG. 1C. As such, the detector 209 receives a portion of the reflected light from a surface and converts the light into electrical signals for further processing by a processing device as described above.

In addition to receiving the reflected light, the detector 209 may also receive a modulated optical signal. For example, the laser source 201, in addition to providing the light for emittance through one of the emitters 205, also may provide light to a modulator 207. The modulator 207 may function substantially as described above with respect to the modulator 123 in FIG. 1C. Accordingly, the modulator 207 may receive the light from the laser source 201, modulate the light, then provide the light to the detector 209, where the detector 209 converts the light into an electrical signal for further processing. In particular, the light from the modulator may be beat with the reflected light to acquire an electrical signal associated with the Doppler shift of the reflected light.

Figure 3:
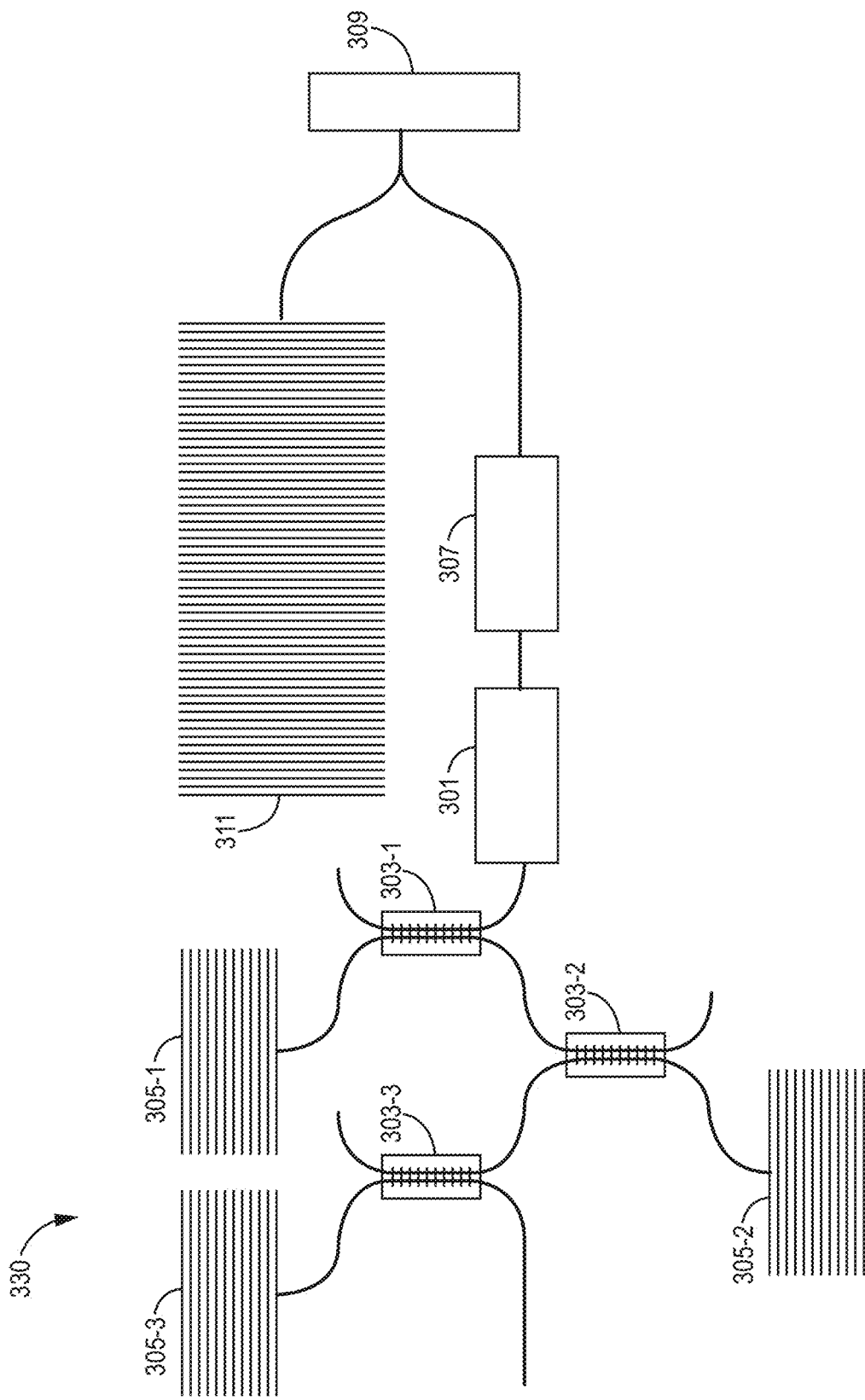
FIG. 3 is a diagram illustrating a time division multiplexed velocimeter according to an aspect of the present disclosure.

FIG. 3 is a diagram illustrating a velocimeter system 330, where the velocimeter system 330 is an implementation of the system 230 in FIG. 2A using integrated silicon photonics. For example, the system 330 includes a laser source 301, switches 303-1-303-3, emitters 305-1-305-3, a modulator 307, and a detector 309 that function substantially as described above with respect to the laser source 201, switches 203-1-203-3, emitters 205-1-205-3, modulator 207, and detector 209 of FIG. 2A. Accordingly, the system 330 is a time division multiplexing optical velocimeter.

In some implementations, the switches 303-1-303-3 may be optical switches that are coupled to the laser source 301. An optical switch 303 may have multiple ports and a switch controller may send electrical signals to a particular optical switch 303 to control the performance of the optical switch 303. For example, the optical switch 303 may have four ports, an input port and two output ports, an on output port and an off output port. When a switch 303 is on, the switch 303 may couple the light received through the input port into the on output port, conversely, when the switch 303 is turned off, the switch 303 may couple the light received through the input port into the off output port.

In certain embodiments, to route the light produced by the laser source 301 to the different optical switches 303-1-303-3, the optical switches 303-1-303-3 may be connected to one another such that the optical switches 303-1-303-3 are cascaded one after another. In some implementations, the laser source 301 may be located off the chip and coupled onto the chip containing the optical switches 303-1-303-3 through butt coupling or other means of introducing laser onto a chip. For example, the laser source 301 may be a single wavelength, continuous wave laser. Alternatively, the laser source 301 may be located on the chip, such as an integrated photonics laser. When the laser source 301 produces the light, the input port of a first optical switch 303-1 may be configured to receive at least a portion of the light produced by the output of the laser source 301. Also, the off output port of the first optical switch 303-1 may be coupled to the input port of a second optical switch 303-2. Also, the off output port of the second optical switch 303-2 may be coupled to the input port of a third optical switch 303-3. The off output port of the third optical switch 303-3 may be an output for the system 330, absorbed, or provided to another system for other purpose. Additionally, the on output ports for the switches 303-1-303-3 may be coupled to respective emitters 305-1-305-3.

In certain embodiments, the emitters 305-1-305-3 may be optical grating couplers, where each optical grating coupler is positioned on the chip to emit the light received from the on output ports of the associated switch 303-1-303-3 into free space in a different direction than the other optical grating couplers. As discussed above, a portion of the emitted light may reflect off of a surface and be incident on a collector 311. As discussed herein, the collector 311 may refer to a device capable of receiving light from free space and coupling the light or transmission through an optical waveguide, fiber, or other optical transmission media. In some implementations, the collector 311 may be an additional optical grating coupler positioned on the same chip or on another chip as the emitters 305-1-305-3. The collector 311 may be coupled in such a way that collected light is provided to a detector 309.

As discussed above, the light produced by the laser source 301 may also be provided to a modulator 307. Additionally, the modulator 307 may provide the modulated optical light to the detector 309. In some implementations, the modulator 307 and detector 309 may be located either on-chip, off-chip, or a combination thereof. When the modulator 307 and detector 309 are on-chip and the laser source 301 is off-chip, the laser source 301 may also be butt coupled to an input of the modulator 307. When the modulator 307 and the detector 309 are off-chip, the output of the detector 309 may be butt coupled to an output of the collector 311. The detector 309 may receive both the collected light from the collector 311 and the modulated light from the modulator 307. Both signals may be beat against one another to produce a signal from which velocity information may be extracted as described above in connection with FIG. 1C.

Figure 4A:
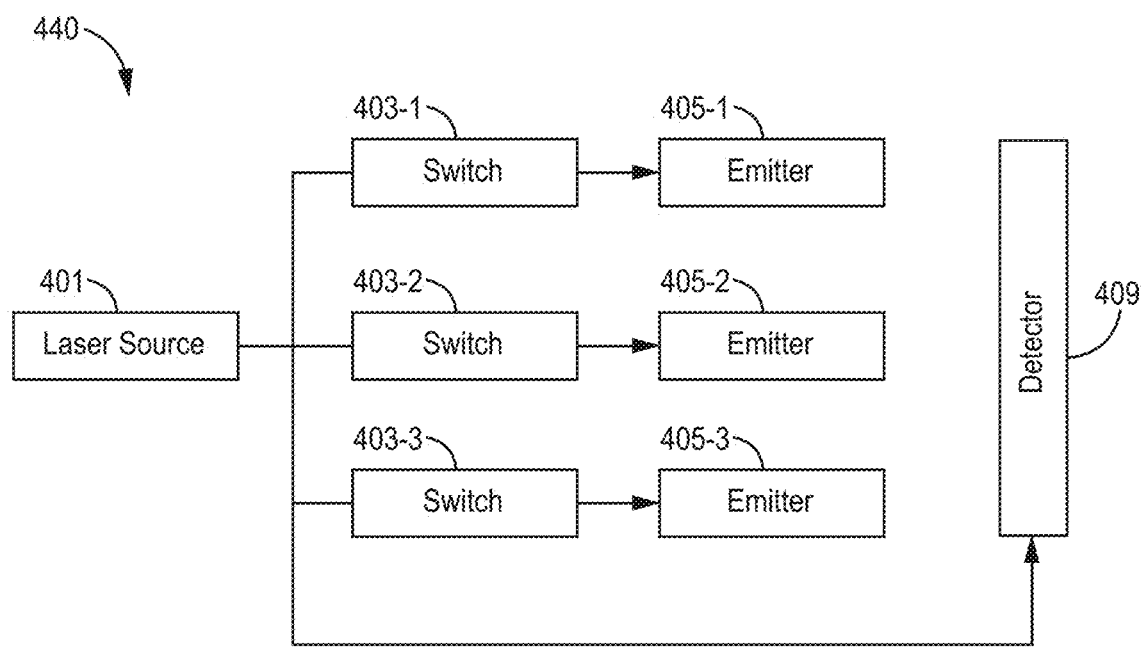
FIG. 4A is a block diagram illustrating a frequency division multiplexed velocimeter according to an aspect of the present disclosure.

FIG. 4A is a block diagram illustrating one embodiment of a system 440 implementing frequency division multiplexing. As illustrated, the system 440 may include a laser source 401. The laser source 401 may function substantially as described above with respect to the laser sources 201 and 301 in FIGS. 2A and 3. The light provided by the laser source 401 is coupled onto one or more emitter paths and provided to a detector 409.

As shown, the system 440 may also include three different emitters 405-1-405-3. The laser source 401 may provide optical energy to the emitters 405-1-405-3 along one of three respective paths. As the system 440 is a frequency division multiplexing velocimeter, each emitter path may also include a respective modulator 403-1-403-3. Accordingly, separate portions of the light from the laser source 401 propagate towards the different emitters 405-1-405-3 at the same time but are emitted by the emitters at different frequencies.

Figure 4B:
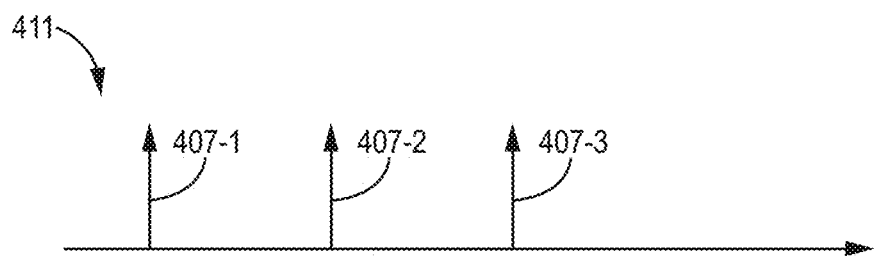
FIG. 4B is a graph illustrating the frequencies of different admitted signals from a frequency division multiplexed velocimeter according to an aspect of the present disclosure.

In some embodiments, FIG. 4B is a graph 411 illustrating the frequencies 407-1-407-3 of light emitted from each emitter 405 during the operation of the system 440. In particular, frequency 407-1 corresponds to the frequency of light emitted from the emitter 405-1, frequency 407-2 corresponds to the frequency of light emitted from the emitter 405-2, and frequency 407-3 corresponds to the frequency of light emitted from the emitter 405-3. As shown, each emitter 405 simultaneously emits a frequency shifted optical beam, where each optical beam emitted by the different emitters 405-1-405-3 is shifted by a different frequency. In some implementations, the difference between the frequencies of the different emitted optical beams is greater than the upper limit of the possible Doppler shift for reflected light received by the system 440. For example, if the upper limit for the velocity is 30 m/s, which corresponds to a Doppler frequency shift of 17 MHz, when the laser source 401 produces lasers having a wavelength of 1550 nm, the modulation frequency shift for the different lasers would be greater than a multiple of 17 MHz.

In certain embodiments, to control the frequency of the light that is emitted from the emitters 405-1-405-3, the system 440 may include multiple modulators 403-1-403-3, where each modulator 403-1-403-3 is associated with one of the emitters 405-1-405-3. In some embodiments, to control the operation of the modulators 403-1-403-3, the system 440 may include or be connected to a modulation controller (not shown). The modulation controller may control the operation of the modulators 403-1-403-3 such that the modulators 403-1-403-3 modulate light at different frequencies. Alternatively, the modulators 403-1-403-3 may be coupled to separate frequency sources that provide different modulation frequency signals to the modulators 403-1-403-3. Thus, each of the emitters 405-1-405-3 emits a light at a different frequency.

In some embodiments, when the light is emitted from the emitters 405-1-405-3, the light is incident on a surface. The surface may reflect the light such that the light is incident on a detector 409. When the detector 409 receives the reflected light, the detector 409 may beat the received light against the frequency of the light produced by the laser source 401 and produce an output signal 127 at the frequency of the doppler shifts experienced by the different emitted beams plus the associated modulation frequency applied by the associated modulator 403-1-403-3. In some embodiments, the output signal may be demodulated by the different modulation frequencies. The demodulation of the output signal from the detector 409 may provide multiple signals representing the different doppler shifts experienced by the different emitted optical signals. Using the different doppler shifts, a navigation system may calculate the velocity of the system 440 in up to three dimensions.

Figure 5:
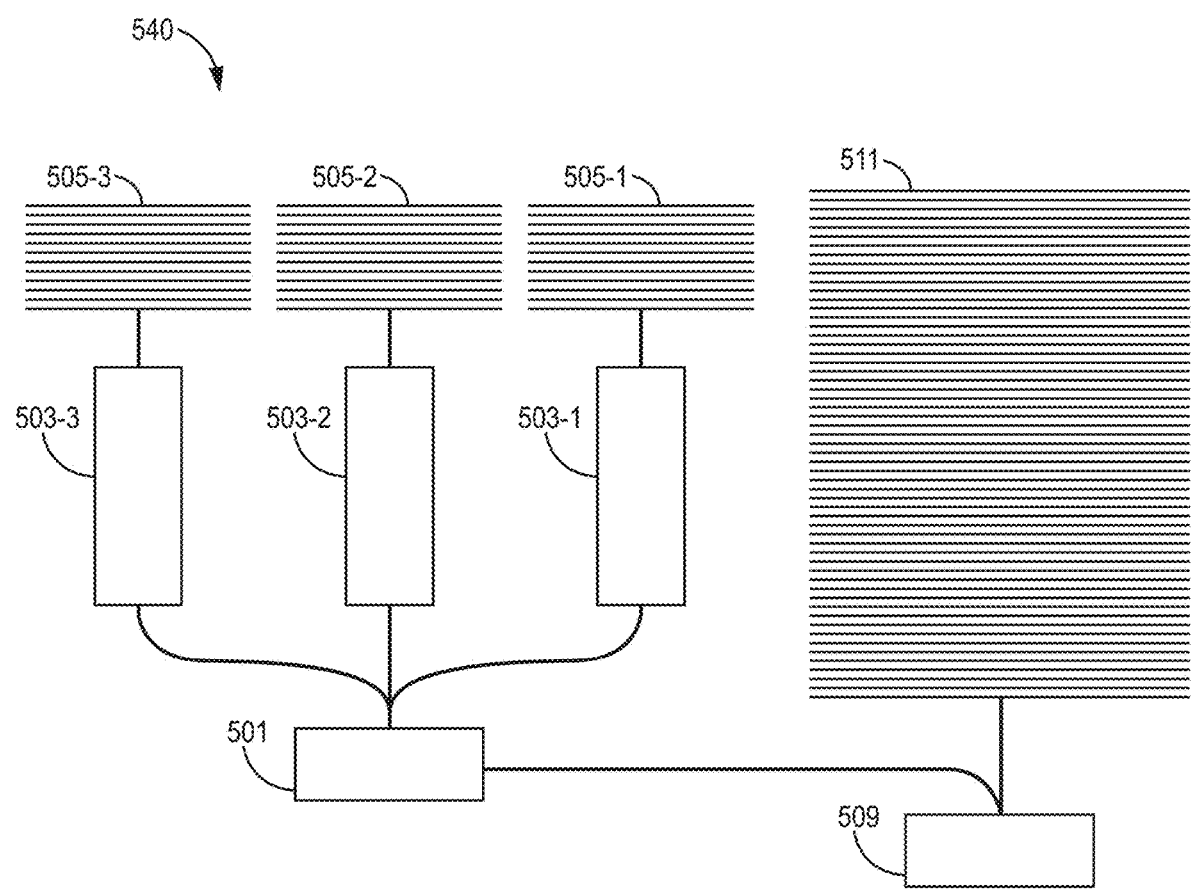
FIG. 5 is a diagram illustrating a frequency division multiplexed velocimeter according to an aspect of the present disclosure.

FIG. 5 is a diagram illustrating a velocimeter system 530, where the velocimeter system 530 is an implementation of the system 440 in FIG. 4A using integrated silicon photonics. For example, the system 540 includes a laser source 501, modulators 503-1-503-3, emitters 505-1-505-3, and a detector 509 that function substantially as described above with respect to the laser source 401, modulators 403-1-403-3, emitters 405-1-405-3, and detector 409 of FIG. 4A. Accordingly, the system 540 is a frequency division multiplexing optical velocimeter.

In some implementations, the modulators 503-1-503-3 may be optical modulators that are coupled to the laser source 501. An optical modulator 503 may have an input port to receive light from the laser source 501. A modulator 503 may be further coupled to electrical signals that control electrodes that modulate the light to a desired frequency. As mentioned above, each of the modulators 503-1-503-3 may modulate the light from the laser source 501 by a different frequency, where the difference between the various modulation frequencies is greater than an expected largest doppler shift. In further implementations, the light received by each modulator 503-1-503-3 may receive the same amount of light from the laser source 501. Alternatively, the different modulators 503-1-503-3 may receive different portions of the light provided by the laser source 501.

In certain embodiments, the laser source 501 may be located off the chip and coupled onto the chip containing the optical modulators 503-1-503-3 through butt coupling or other means of introducing laser onto a chip. For example, the laser source 501 may be a single wavelength, continuous wave laser. Alternatively, the laser source 501 may be located on the chip, such as an integrated photonics laser. When the laser source 501 produces the light, the modulators 503-1-503-3 may receive the light from the laser source 501 as described above. Additionally, the output ports for the modulators 503-1-503-3 may be coupled to respective emitters 505-1-505-3. In contrast to the system 330 described above, due to the light being divided into portions when provided to the modulators 503-1-503-3, when the laser source 301 and 501 produce a substantially similar laser, the light emitted by a particular emitter 505-1-505-3 has less power than the light emitted from an emitter 305-1-305-3.

In certain embodiments, the emitters 505-1-505-3 may be grating couplers like the emitters 305-1-303-3, where each grating coupler is positioned on the chip to emit the light received from the output ports of the associated modulator 503-1-503-3 into free space in a different direction than the other emitters 501-1-505-3. As discussed above, a portion of the emitted light may reflect off of a surface and be incident on a collector 511. As discussed herein, the collector 511 may refer to a device capable of receiving light from free space and coupling the light for transmission through an optical waveguide, fiber, or other optical transmission media. In some implementations, the collector 511 may be an additional grating coupler positioned on the same chip as the emitters 505-1-505-3. The collector 511 may be coupled in such a way that collected light is provided to a detector 509.

As discussed above, the light produced by the laser source 501 may also be provided to the detector 509. When the laser source 501 is off-chip, the laser source 501 may also be butt coupled to an input of the detector 509. The detector 509 may receive both the collected light from the collector 511 and the light from the laser source 501 and beat the received signals against one another to produce an electrical signal through which velocity information may be extracted as described above in connection with FIG. 1C.

Figure 6A:
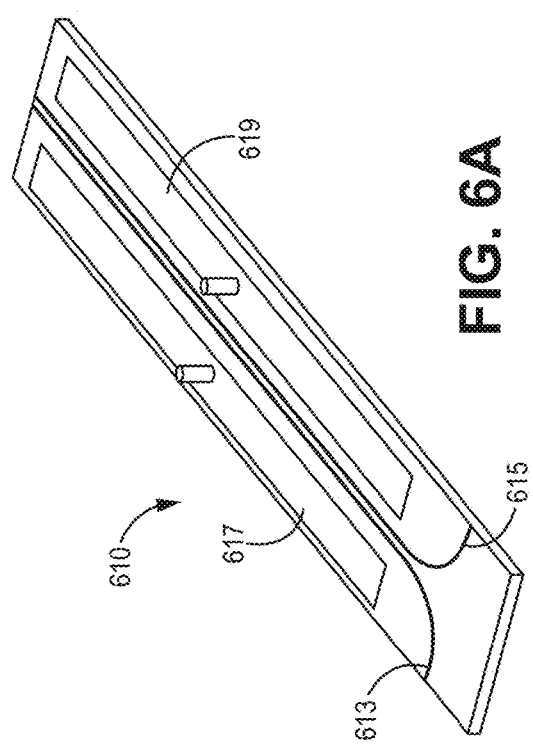
FIG. 6A is a diagram of an optical modulator according to an aspect of the present disclosure.
Figure 6B:
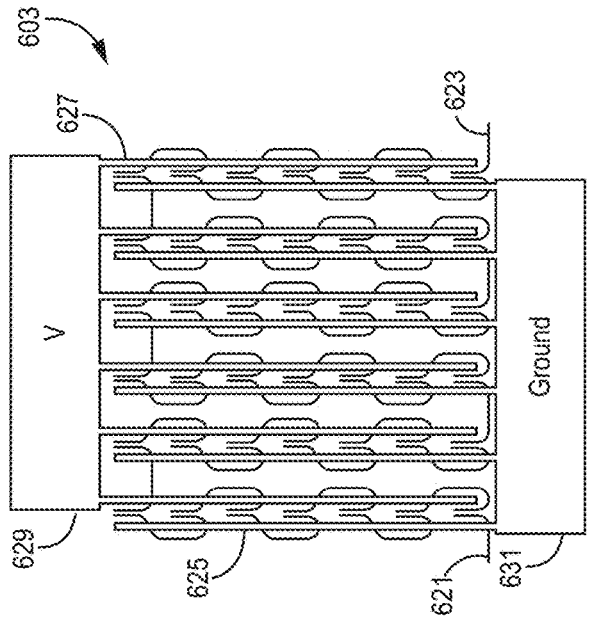
FIG. 6B is a diagram of multiple optical modulators according to an aspect of the present disclosure.

FIGS. 6A-6D are diagrams that illustrate certain aspects of a modulator such as the modulators 503-1-503-3 in FIG. 5. For example, FIG. 6A illustrates a modulating segment 610, where the modulating segment 610 is able to modulate light through a frequency range. For example, the modulating segment 610 includes an input waveguide 613 and an output waveguide 615. In particular, the modulating segment 610 may receive light through the input waveguide 613 and couple the received light into the output waveguide 615. For example, the input waveguide 613 extends parallel to the output waveguide 615. When light is propagating towards the end of the input waveguide 613, the light is incrementally coupled into the output waveguide 615 such that the light propagates through the output waveguide 615 in an opposite direction from the direction of propagation in the input waveguide 613.

Additionally, to modulate the light that is coupled from the input waveguide 613 into the output waveguide 615, the parallel portions of the input waveguide 613 and the output waveguide 615 may extend between two different electrodes 617 and 619 that extend parallel to the parallel portions of the input waveguide 613 and the output waveguide 615. One of the electrodes may be a ground electrode 617 and the other electrode may be a voltage electrode 619. To modulate the light that is coupled into the output waveguide 615, a voltage may be applied to the voltage electrode 619. Additionally, the voltage applied to the voltage electrode 619 may be changing continuously. The changing voltage changes the electric field through which the light is coupled from the input waveguide 613 into the output waveguide 615. The change in electric field may modulate the light coupled from the input waveguide 613 into the output waveguide 615.

In certain embodiments, the amount through which a single modulating segment 610 can modulate the light coupled from the input waveguide 613 into the output waveguide 615 may be limited. For example, a single modulating segment 610 may be unable to modulate the light by a frequency greater than the possible doppler shifts. Accordingly, a modulator 603 may include multiple modulating segments 610 that are connected to one another serially, where each modulating segment 610 modulates the light incrementally until the light has been modulated by the desired modulation frequency.

In some embodiments, the modulator 603 may include an input 621 and an output 623. The input 621 receives the light, whereupon the light is repeatedly coupled from input waveguides 613 to output waveguides 615 in the presence of a changing electric field. For example, the changing electric field may be caused by multiple voltage electrodes 627 and ground electrodes 625. In some embodiments, the multiple voltage electrodes 627 may be connected to a voltage source 629 and the ground electrodes 625 may be connected to a ground 631. The multiple voltage electrodes 627 may be interleaved with the ground electrodes 625 such that the parallel sections of each modulating segment are between proximately positioned voltage electrodes 627 and ground electrodes 625.

Figure 6C:
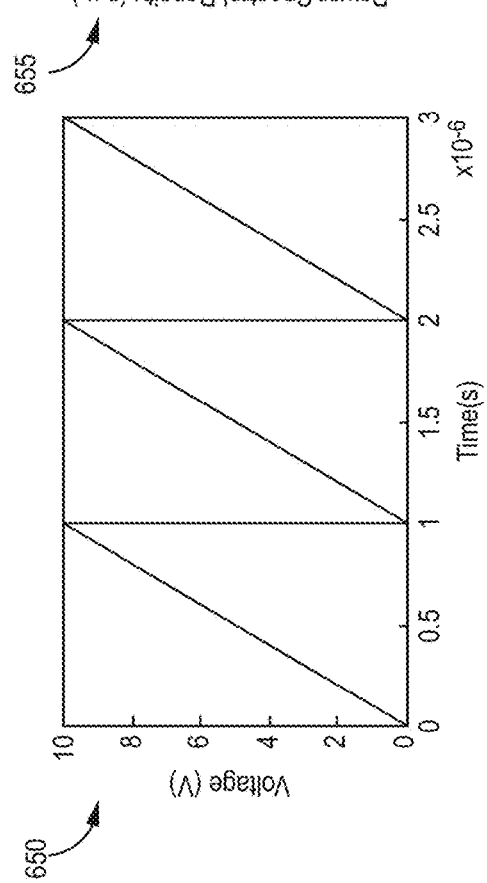
FIG. 6C is a graph illustrating the voltage applied to a modulator over time according to an aspect of the present disclosure.

FIG. 6C is a graph 650 illustrating the voltage applied to the voltage electrodes 627 over time. As illustrated, the voltage applied to the voltage electrode sweeps repeatedly between a lower voltage and an upper voltage at a constant rate. For example, over a microsecond, the voltage may sweep between 0 V and 10 V at a constant rate of 10 V per microsecond. In some embodiments, when the voltage reaches an upper voltage, the voltage is then set again to the lower voltage. For example, when the voltage reaches 10 V, the voltage applied to the voltage electrodes 627 may be reset to the lower voltage of 0 V.

Figure 6D:
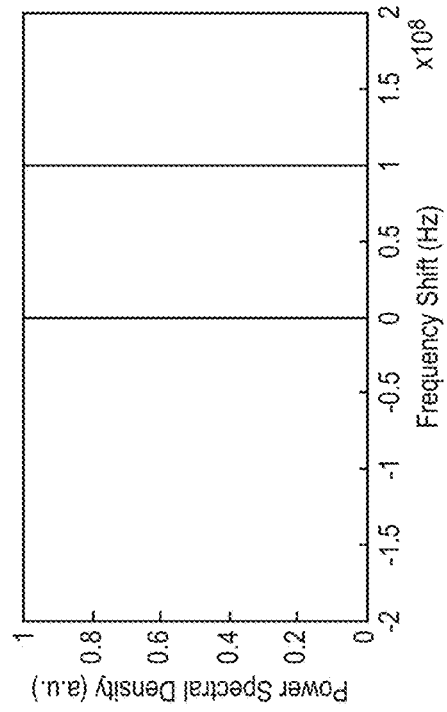
FIG. 6D is a graph illustrating the frequency shift of an optical signal through a modulator according to an aspect of the present disclosure.

FIG. 6D is a graph 655 illustrating the frequency change to the light caused by the application of the voltage to the voltage electrodes 627. When there is no voltage applied, there is also no frequency shift of the light propagating through the modulator 603. However, when a voltage is applied to the voltage electrodes 627, the light may experience a frequency shift. For example as illustrated, the light may experience a frequency shift of $1 \times 10^8$ Hz. The frequency shift illustrated may be associated with one or more modulating segments. Accordingly, any number of modulating segments be used to acquire the desired frequency shift of the light within the modulator 603. As such, the different modulators 503-1-503-3 within the system 540 illustrated in FIG. 5 may have different numbers of modulating segments to modulate the light propagating therein by the desired modulation frequency.

Figure 7:
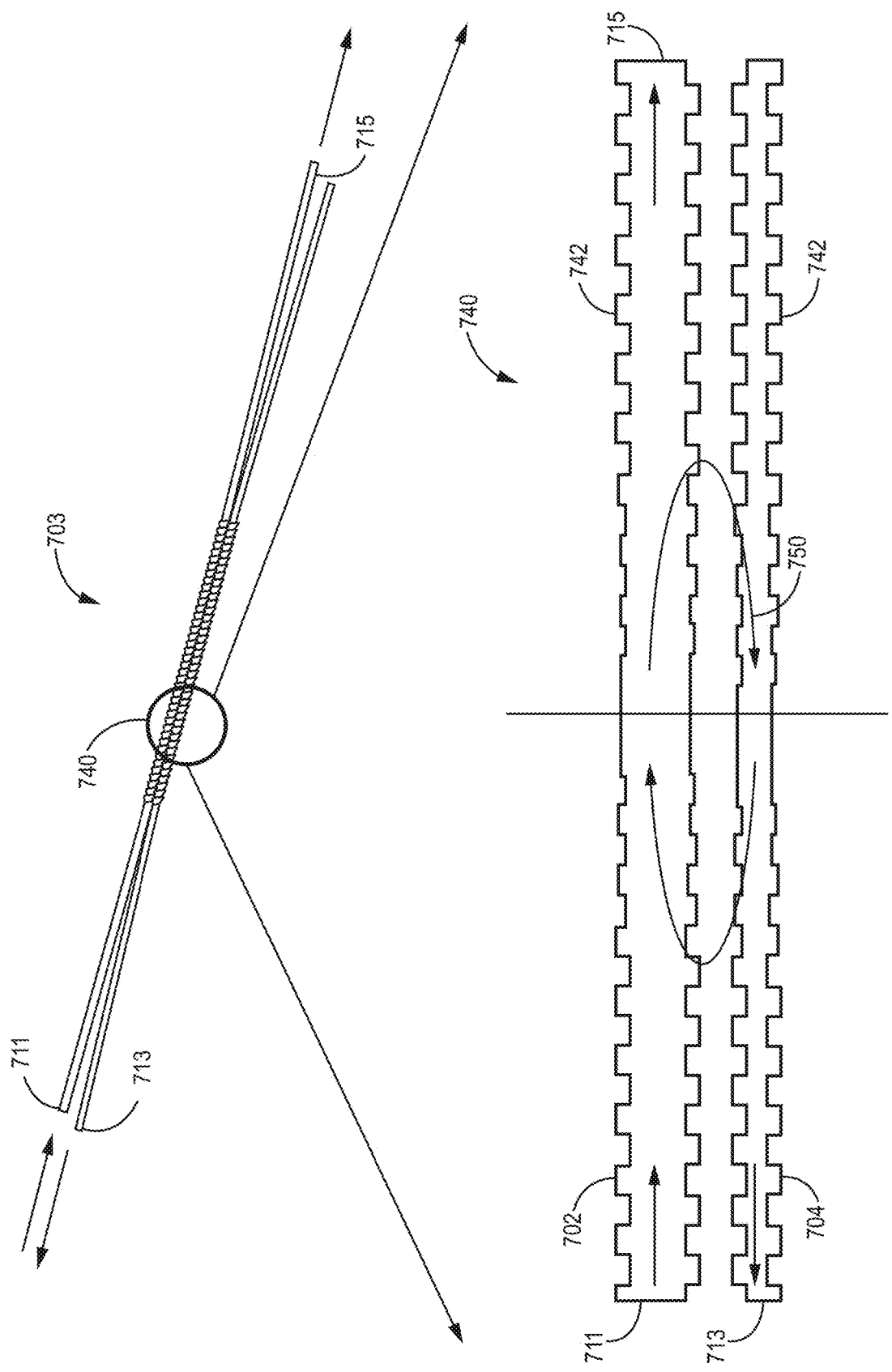
FIG. 7 is a diagram of an optical switch according to an aspect of the present disclosure.

FIG. 7 is a diagram illustrating an optical switch 703 that provides the functionality associated with the optical switches 303-1-303-3 in FIG. 3. As shown, the optical switch 703 may be a notch filter that includes an input port 711, a reflection port 713, and a drop port 715. The notch filter may allow a first frequency to pass through a drop port 715 of the optical switch 703 and light at other frequencies is reflected towards the reflection port 713. Further, when a voltage is applied to the optical switch 703 or to electrodes next to the optical switch 703, the frequency that is passed to the drop port 715 may change such that light that was initially output through the drop port 715 may then be output through the reflection port 713. Accordingly, the optical switches 303 described above in FIG. 3 may be initially configured to pass the light at the frequency provided by the laser source 301 to the respective drop port 715. As the optical switches 303 are in series, the application of a voltage to the first switch 303-1 may shift the frequency and cause the light to be output through the associated reflection port 713 and passed to the second switch 301-2. A voltage applied to both the first switch 301-1 and to the second switch 301-2 may cause the light to be passed to the third switch in a similar manner.

In additional embodiments, a grating-assisted directional coupler 740 may be located in a central portion of the waveguide structure between input port 711 and drop port 715. The grating-assisted directional coupler 740 may have a periodic grating structure 742 on each of first and second waveguides 702, 704. In one embodiment, the optical switch 730 may be based on a silicon nitride-based design.

The optical switch 730 is configured to receive light injected into input port 710, which directs the light to grating-assisted directional coupler 740, which interacts with the light. At the center of the periodic grating structure 742, a pi phase shift in the phase of the modulation employed to create the grating generates a tightly confined light field 750 at the resonance wavelength, with the light circulating around the pi phase shift. A pi phase shift is an abrupt change in the phase of the modulation that defines the grating. If the grating to the left of the shift (x<x_shift) is defined by the function sin(2*pi*x/period), then the grating to the right of the shift (x>x_shift) is defined by the function sin((2*pi*x/period)+pi). In other words, a pi phase shift is an abrupt change in a spatial pattern of the waveguide modulation, such that a periodic structure of the waveguide modulation is shifted in spatial phase by pi radians on either side of an interface.

Figure 8A:
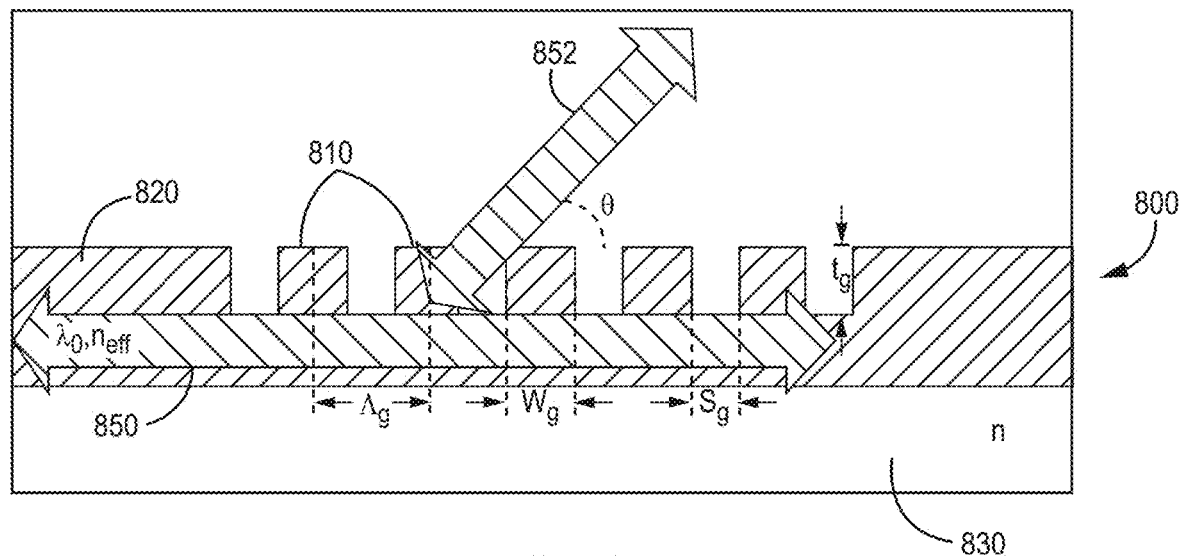
FIGS. 8A-8B is a diagram illustrating a grating coupler according to an aspect of the present disclosure.

FIG. 8A is a cross-sectional side view of a grating coupler 800, such as a SiP grating coupler, which can be utilized in the sensor systems described previously as the emitters 305-1-305-3 and 505-1-505-3 and the collectors 311 and 511 described in FIGS. 3 and 5 respectively. The grating coupler 800 includes a periodic grating structure 810, which is formed as part of a waveguide layer 820 that is composed of a higher refractive index material. The periodic grating structure 810 and waveguide layer 820 are embedded in a cladding layer 830, which is composed of a lower refractive index material.

FIG. 8A illustrates the design parameters of grating coupler 800, which is based on the following equation:

$$\frac{2\pi n}{\lambda_0}\sin(\theta) = \frac{2\pi n_{\mathit{eff}}}{\lambda_0} - \frac{2\pi}{\Lambda_g}$$

where n is the refractive index of the cladding material, $\lambda_0$ is the wavelength of the input light, $n_{\mathit{eff}}$ is the effective refractive index of the grating material, $\theta$ is the angle of the diffracted light, and $\Lambda_g$ is the spatial period of the grating structure. As further shown in FIG. 8, $w_g$ is the width of a single periodic grating structure, $s_g$ is the space between adjacent periodic grating structures, and $t_g$ is the thickness of each periodic grating structure.

As depicted in FIG. 8, the periodic grating structure 810 is formed to preferentially diffract an input light beam 850 in a direction of interest at a selected angle as a diffracted light beam 852. out of the waveguide as an emitter. For a given wavelength, this diffraction angle can cover nearly the entire 180 degree angular space above a chip where grating coupler 800 is located. As a reciprocal device, such as a collector, the grating coupler can additionally receive specific-wavelength light from a given angle of interest. Therefore, for a known wavelength, the angle of incidence can be readily determined. Accordingly, grating coupler 800 can be incorporated into a chip to diffract in-plane light from a waveguide to out-of-plane, or to receive out-of-plane light that is coupled into an in-plane waveguide.

Figure 8B:
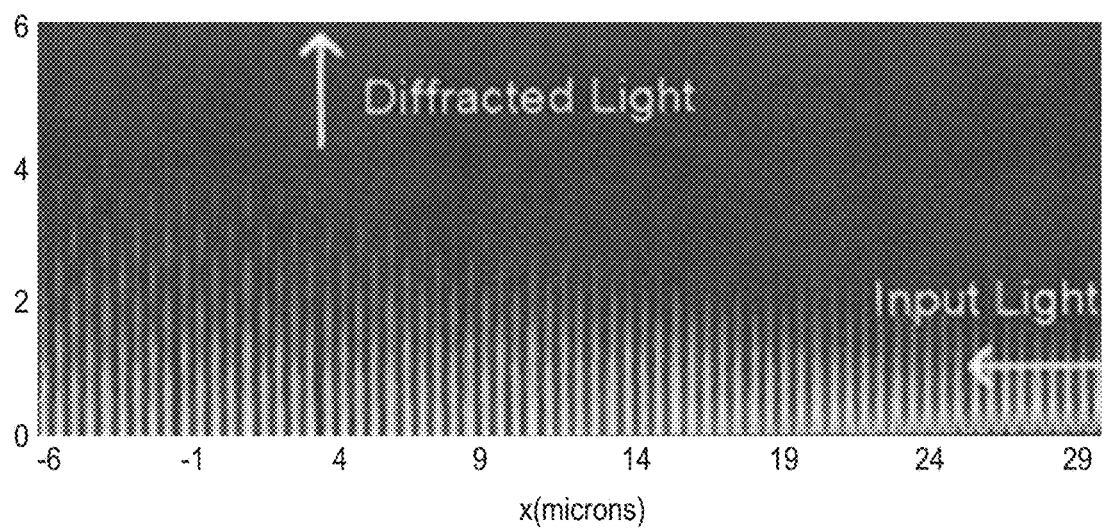

FIG. 8B is a modeled graphical representation of the simulated performance of grating coupler 800, such as a SiP grating coupler. FIG. 8A shows the input light field propagating along the grating as well as the significantly weaker, diffracted light field. The diffracted light field may become stronger relative to the propagating light field, reducing required grating size, by increasing the grating coefficient. This may in turn be done by increasing the etch depth of the grating.

Figure 9:
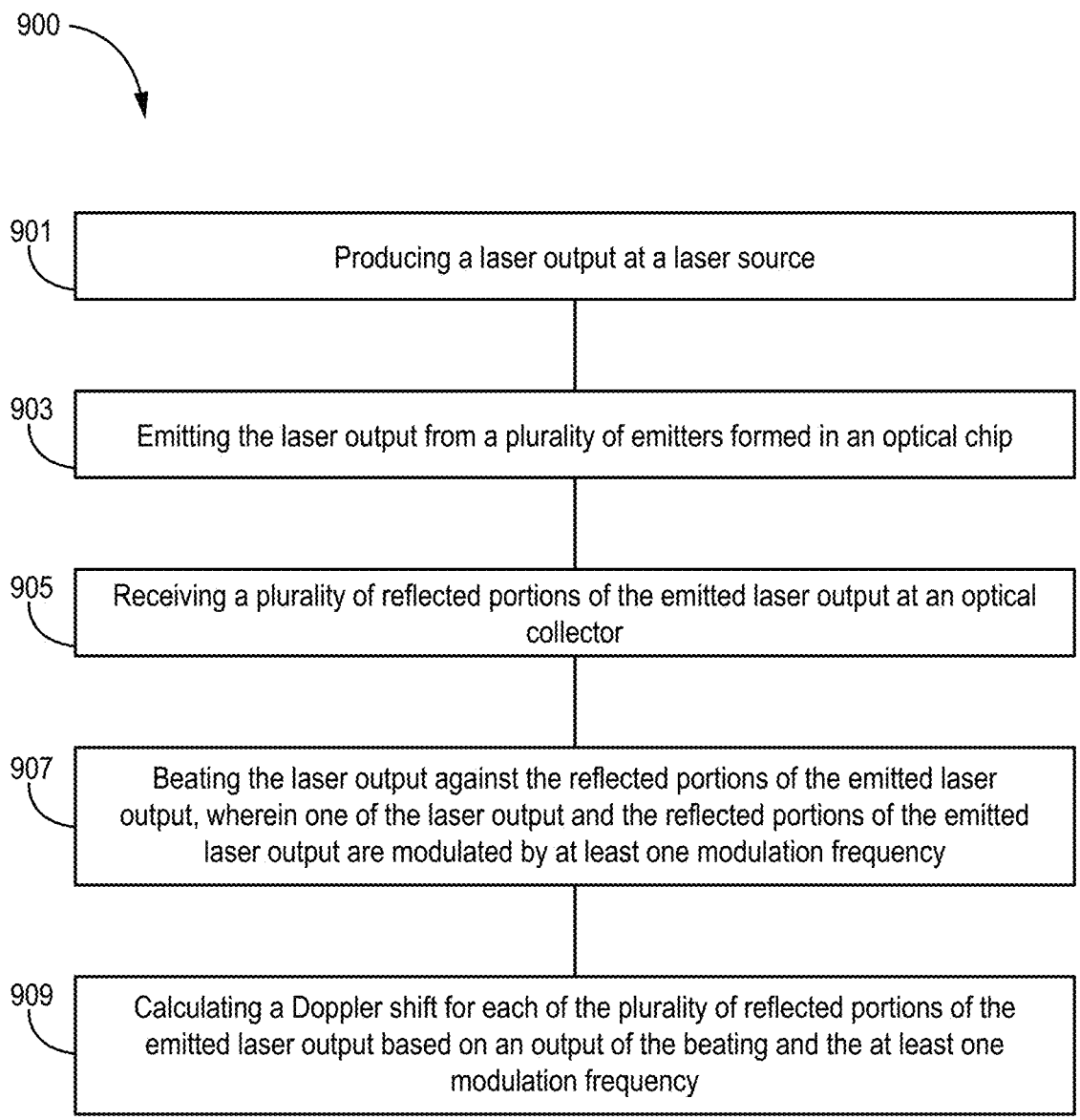
FIG. 9 is a flowchart diagram illustrating an exemplary method for providing velocity measurements using a silicon photonics integrated optical velocimeter according to an aspect of the present disclosure.

FIG. 9 is a flowchart diagram of a method 900 for operating an optical velocimeter according to one or more of the embodiments described above. Method 900 proceeds at 901, where a laser output is produced at a laser source. The method 900 may then proceed at 903, where the laser output is emitted from a plurality of emitters formed in an optical chip. Additionally, the method 900 proceeds at 905, where a plurality of reflected portions of the emitted laser output are received at an optical collector. Further, the method 900 proceeds at 907, where the laser output is beat against the reflected portions of the emitted laser output, wherein one of the laser output and the reflected portions of the emitted laser output are modulated by at least one modulation frequency. The method 900 may then proceed at 909, where a Doppler shift is calculated for each of the plurality of reflected portions of the emitted laser output based on an output of the beating and the at least one modulation frequency.

EXAMPLE EMBODIMENTS

Example 1 includes an optical velocimeter, configured to be mounted on an object, comprising: a laser source comprising a laser output; a plurality of optical switches, each optical switch comprising an optical switch input and an optical switch output; wherein the laser output is coupled through one of the optical switches in the plurality of optical switches to provide an optical signal; a plurality of optical grating couplers, wherein each optical grating coupler in the plurality of optical grating couplers is respectively coupled to an optical switch output of an associated optical switch in the plurality of optical switches, wherein the plurality of optical grating couplers are formed on a single surface and in one plane of a chip; wherein the different optical grating couplers in the plurality of optical grating couplers are configured to sequentially emit optical signals from the plurality of optical switches; a collector optical grating coupler configured to receive a reflected portion of the emitted optical signals wherein the reflected portion of the emitted optical signals are portions of the emitted optical signals that are reflected from at least one surface; and an optical detector, coupled to the collector optical grating coupler, configured to generate a signal from each received reflected portion, where the signals are indicative of a velocity of the object.

Example 2 includes the optical velocimeter of Example 1, wherein the plurality of optical switches are a plurality of notch filters and the optical switch input is an input port of a respective notch filter and the optical switch output is an output port of the respective notch filter.

Example 3 includes the optical velocimeter of Example 2, wherein a reflection port for at least one notch filter in the plurality of notch filters is coupled to another input port for at least one other notch filter.

Example 4 includes the optical velocimeter of any of Examples 2-3, further comprising a voltage source coupled to each of the plurality of notch filters, wherein the voltage source separately applies a voltage to each notch filter in the plurality of notch filters to suppress the laser output.

Example 5 includes the optical velocimeter of any of Examples 1-4, further comprising a modulator coupled to the laser source to modulate the laser output and provide the modulated laser output to the optical detector.

Example 6 includes the optical velocimeter of Example 5, wherein the modulator modulates the laser output by a modulation frequency that is greater than a frequency associated with possible doppler shifts of the received reflected portion of the emitted optical signals.

Example 7 includes the optical velocimeter of any of Examples 5-6, wherein the modulated laser output is beat against the received reflected portion of the emitted optical signals.

Example 8 includes the optical velocimeter of any of Examples 1-7, wherein the velocity of the object is determined in three dimensions.

Example 9 includes the optical velocimeter of any of Examples 1-8, wherein the collector optical grating coupler, the plurality of optical grating couplers, and the plurality of optical switches are formed on the chip.

Example 10 includes an optical velocimeter, configured to be mounted on an object, comprising: a laser source comprising a laser output; a plurality of optical modulators, each optical modulator comprising a modulator input and a modulator output, wherein each of the plurality of optical modulators are configured to modulate the laser output at different modulation frequencies; a plurality of optical grating couplers, wherein each optical grating coupler in the plurality of optical grating couplers is respectively coupled to the modulator output of an associated optical modulator in the plurality of optical modulators, wherein the plurality of optical grating couplers are formed on a single surface and in one plane of a chip; wherein the plurality of optical grating couplers emit respectively modulated laser output; a collector optical grating coupler configured to receive a reflected portion of the emitted modulated laser output, wherein the reflected portion of the emitted modulated laser output are portions of the emitted modulated laser output that are reflected from at least one surface; and an optical detector, coupled to the collector optical grating coupler, configured to generate a signal from each received reflected portion, where the signals are indicative of a velocity of the object.

Example 11 includes the optical velocimeter of Example 10, wherein an optical modulator in the plurality of optical modulators comprises one or more modulating segments, each segment having a segment input and a segment output.

Example 12 includes the optical velocimeter of Example 11, wherein each optical modulator comprises a different number of the one or more modulating segments in proportion to the different modulation frequencies.

Example 13 includes the optical velocimeter of any of Examples 11-12, wherein the segment input comprises an input waveguide and the segment output comprises an output waveguide, wherein the input waveguide and the output waveguide extend parallel to one another between one or more ground electrodes and one or more voltage electrodes.

Example 14 includes the optical velocimeter of Example 13, further comprising a voltage source coupled to the one or more voltage electrodes, wherein a voltage applied to the one or more voltage electrodes by the voltage source changes at a rate associated with the different modulation frequencies.

Example 15 includes the optical velocimeter of any of Examples 10-14, wherein a smallest frequency difference between the different modulation frequencies is greater than a frequency associated with possible doppler shifts of the received reflected portion of the emitted modulated laser output.

Example 16 includes the optical velocimeter of any of Examples 10-15, wherein the laser output is beat against the each received reflected portion.

Example 17 includes the optical velocimeter of any of Examples 10-16, wherein the collector optical grating coupler, the plurality of modulators, and the plurality of optical grating couplers are formed on the chip.

Example 18 includes a method comprising: producing a laser output at a laser source; emitting the laser output from a plurality of emitters formed in an optical chip; receiving a plurality of reflected portions of the emitted laser output at an optical collector formed in the optical chip, wherein the plurality of reflected portions are reflected off of at least one surface; beating the laser output against the reflected portions of the emitted laser output, wherein one of the laser output or the reflected portions of the emitted laser output are modulated by at least one modulation frequency; and calculating a doppler shift for each of the plurality of reflected portions of the emitted laser output based on an output of the beating and the at least one modulation frequency.

Example 19 includes the method of Example 18, wherein emitting the laser output from a plurality of emitters comprises using a plurality of optical switches to sequentially provide the laser output to each of the plurality of emitters.

Example 20 includes the method of any of Examples 18-19, wherein emitting the laser output from a plurality of emitters comprises modulating the laser output provided to each of the plurality of emitters by a different modulation frequency.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical velocimeter, configured to be mounted on an object, comprising:
   a laser source comprising a laser output;
   a plurality of optical switches, each optical switch comprising an optical switch input and an optical switch output;
   wherein the laser output is coupled through one of the optical switches in the plurality of optical switches to provide an optical signal;
   a plurality of optical grating couplers, wherein each optical grating coupler in the plurality of optical grating couplers is respectively coupled to an optical switch output of an associated optical switch in the plurality of optical switches, wherein the plurality of optical grating couplers are formed on a single surface and in one plane of a chip;
   wherein the different optical grating couplers in the plurality of optical grating couplers are configured to sequentially emit optical signals from the plurality of optical switches;
   a collector optical grating coupler configured to receive a reflected portion of the emitted optical signals wherein the reflected portion of the emitted optical signals are portions of the emitted optical signals that are reflected from at least one surface; and
   an optical detector, coupled to the collector optical grating coupler, configured to generate a signal from each received reflected portion, where the signals are indicative of a velocity of the object.

2. The optical velocimeter of claim 1, wherein the plurality of optical switches are a plurality of notch filters and the optical switch input is an input port of a respective notch filter and the optical switch output is an output port of the respective notch filter.

3. The optical velocimeter of claim 2, wherein a reflection port for at least one notch filter in the plurality of notch filters is coupled to another input port for at least one other notch filter.

4. The optical velocimeter of claim 2, further comprising a voltage source coupled to each of the plurality of notch filters, wherein the voltage source separately applies a voltage to each notch filter in the plurality of notch filters to suppress the laser output.

5. The optical velocimeter of claim 1, further comprising a modulator coupled to the laser source to modulate the laser output and provide the modulated laser output to the optical detector.

6. The optical velocimeter of claim 5, wherein the modulator modulates the laser output by a modulation frequency that is greater than a frequency associated with possible doppler shifts of the received reflected portion of the emitted optical signals.

7. The optical velocimeter of claim 5, wherein the modulated laser output is beat against the received reflected portion of the emitted optical signals.

8. The optical velocimeter of claim 1, wherein the velocity of the object is determined in three dimensions.

9. The optical velocimeter of claim 1, wherein the collector optical grating coupler, the plurality of optical grating couplers, and the plurality of optical switches are formed on the chip.

10. An optical velocimeter, configured to be mounted on an object, comprising:
  a laser source comprising a laser output;
  a plurality of optical modulators, each optical modulator comprising a modulator input and a modulator output, wherein each of the plurality of optical modulators are configured to modulate the laser output at different modulation frequencies;
  a plurality of optical grating couplers, wherein each optical grating coupler in the plurality of optical grating couplers is respectively coupled to the modulator output of an associated optical modulator in the plurality of optical modulators, wherein the plurality of optical grating couplers are formed on a single surface and in one plane of a chip;
  wherein the plurality of optical grating couplers emit respectively modulated laser output;
  a collector optical grating coupler configured to receive a reflected portion of the emitted modulated laser output, wherein the reflected portion of the emitted modulated laser output are portions of the emitted modulated laser output that are reflected from at least one surface; and
  an optical detector, coupled to the collector optical grating coupler, configured to generate a signal from each received reflected portion, where the signals are indicative of a velocity of the object.

11. The optical velocimeter of claim 10, wherein an optical modulator in the plurality of optical modulators comprises one or more modulating segments, each segment having a segment input and a segment output.

12. The optical velocimeter of claim 11, wherein each optical modulator comprises a different number of the one or more modulating segments in proportion to the different modulation frequencies.

13. The optical velocimeter of claim 11, wherein the segment input comprises an input waveguide and the segment output comprises an output waveguide, wherein the input waveguide and the output waveguide extend parallel to one another between one or more ground electrodes and one or more voltage electrodes.

14. The optical velocimeter of claim 13, further comprising a voltage source coupled to the one or more voltage electrodes, wherein a voltage applied to the one or more voltage electrodes by the voltage source changes at a rate associated with the different modulation frequencies.

15. The optical velocimeter of claim 10, wherein a smallest frequency difference between the different modulation frequencies is greater than a frequency associated with possible doppler shifts of the received reflected portion of the emitted modulated laser output.

16. The optical velocimeter of claim 10, wherein the laser output is beat against the each received reflected portion.

17. The optical velocimeter of claim 10, wherein the collector optical grating coupler, the plurality of modulators, and the plurality of optical grating couplers are formed on the chip.

18. A method comprising:
  producing a laser output at a laser source;
  emitting the laser output from a plurality of emitters formed in an optical chip using a plurality of optical switches to sequentially provide the laser output to each of the plurality of emitters;
  receiving a plurality of reflected portions of the emitted laser output at an optical collector formed in the optical chip, wherein the plurality of reflected portions are reflected off of at least one surface;
  beating the laser output against the reflected portions of the emitted laser output, wherein one of the laser output or the reflected portions of the emitted laser output are modulated by at least one modulation frequency; and
  calculating a doppler shift for each of the plurality of reflected portions of the emitted laser output based on an output of the beating and the at least one modulation frequency.

* * * * *